United States Patent
Paz et al.

(10) Patent No.: US 10,818,883 B2
(45) Date of Patent: Oct. 27, 2020

(54) LITHIUM ION BATTERIES HAVING TRANSPARENT POUCHES

(71) Applicant: StoreDot Ltd., Herzeliya (IL)

(72) Inventors: Ron Paz, Rehovot (IL); Yaniv Damtov, Rehovot (IL); Leonid Krasovitsky, Rishon LeTzion (IL)

(73) Assignee: StoreDot Ltd., Herzeliya (IL)

(*) Notice: Subject to any disclaimer, the term of this patent is extended or adjusted under 35 U.S.C. 154(b) by 80 days.

(21) Appl. No.: 15/912,744

(22) Filed: Mar. 6, 2018

(65) Prior Publication Data

US 2018/0254440 A1    Sep. 6, 2018

Related U.S. Application Data

(60) Provisional application No. 62/467,261, filed on Mar. 6, 2017.

(51) Int. Cl.
| | |
|---|---|
| H01M 2/02 | (2006.01) |
| H01M 2/04 | (2006.01) |
| H01M 10/0525 | (2010.01) |
| H01M 10/058 | (2010.01) |
| H01M 10/48 | (2006.01) |

(52) U.S. Cl.
CPC ....... H01M 2/0257 (2013.01); H01M 2/0275 (2013.01); H01M 2/04 (2013.01); H01M 10/058 (2013.01); H01M 10/0525 (2013.01); H01M 10/488 (2013.01); H01M 2002/0297 (2013.01)

(58) Field of Classification Search
CPC ................................................. H01M 10/488
See application file for complete search history.

(56) References Cited

U.S. PATENT DOCUMENTS

| | | | |
|---|---|---|---|
| 9,406,927 B1 | 8/2016 | Burshtain et al. | |
| 2007/0211328 A1* | 9/2007 | Lerenius | H04M 1/0283 |
| | | | 359/265 |
| 2009/0111008 A1* | 4/2009 | Wen | H01M 2/1066 |
| | | | 429/96 |
| 2014/0136132 A1* | 5/2014 | Maekawa | H01M 10/052 |
| | | | 702/63 |
| 2015/0044532 A1* | 2/2015 | Hsiao | H01M 10/488 |
| | | | 429/92 |
| 2019/0036122 A1* | 1/2019 | Iordache | H01M 4/131 |

OTHER PUBLICATIONS

Zhidan Zenga et al. "In situ measurement of lithiation-induced stress in silicon nanoparticles using micro-Raman spectroscopy" Nano Energy vol. 22, Apr. 2016, pp. 105-110.

* cited by examiner

*Primary Examiner* — Brian R Ohara
(74) *Attorney, Agent, or Firm* — Reches Patent

(57) ABSTRACT

Lithium ion batteries and cells, as well as operating and testing methods are provided, which utilize a transparent pouch to monitor the battery in operational condition and/or in operation. Covers may be used to prevent illumination of battery components when testing is not required, and the covers may be removed or have modifiable transparency configured to enable visual monitoring. Indicators in the transparent pouch may be associated with cell components such as electrodes and electrolyte to indicate their condition. For example, the transparent pouch may be used to monitor battery safety, e.g., by enabling to monitor lithium metallization on an anode (directly or via indicators), monitor battery lifetime and other operational parameters, without having to damage the battery.

18 Claims, 3 Drawing Sheets

LITHIUM ION BATTERIES HAVING TRANSPARENT POUCHES

CROSS REFERENCE TO RELATED APPLICATIONS

This application claims the benefit of U.S. Provisional Patent Application No. 62/467,261, filed on Mar. 6, 2017, which is hereby incorporated by reference in its entirety.

BACKGROUND OF THE INVENTION

1. Technical Field

The present invention relates to the field of lithium ion batteries, and more particularly, to monitoring lithium ion batteries.

2. Discussion of Related Art

Expanding use of lithium ion batteries raises the need for reliable ways to monitor battery operation as well as advanced testing methods for improved batteries.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising enclosing at least one lithium ion cell of a lithium ion battery in a transparent pouch configured to maintain an operative condition of the lithium ion battery, and monitoring the lithium ion battery in the operative condition thereof.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1C:
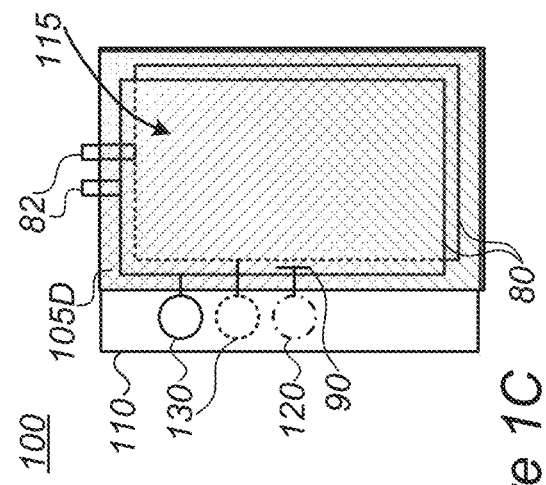
FIGS. 1A-1C are high level schematic illustration of lithium ion batteries, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Lithium ion batteries and cells, as well as operating and testing methods are provided, which utilize a transparent pouch to monitor the battery in operational condition and/or in operation. Covers may be used to prevent illumination of battery components when testing is not required, and the covers may be removed or have modifiable transparency configured to enable visual monitoring. Indicators in the transparent pouch may be associated with cell components such as electrodes and electrolyte to indicate their condition. For example, the transparent pouch may be used to monitor battery safety, e.g., by enabling to monitor lithium metallization on an anode (directly or via indicators), monitor battery lifetime and other operational parameters, without having to damage the battery.

Figure 1B:
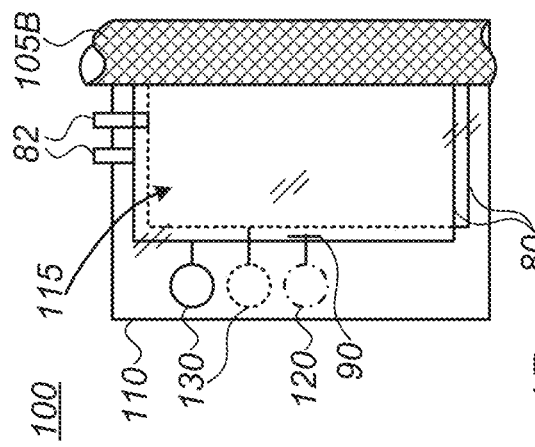
Figure 1A:
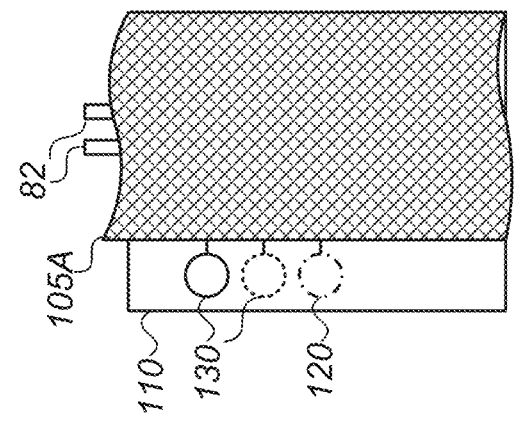
Figure 1A:
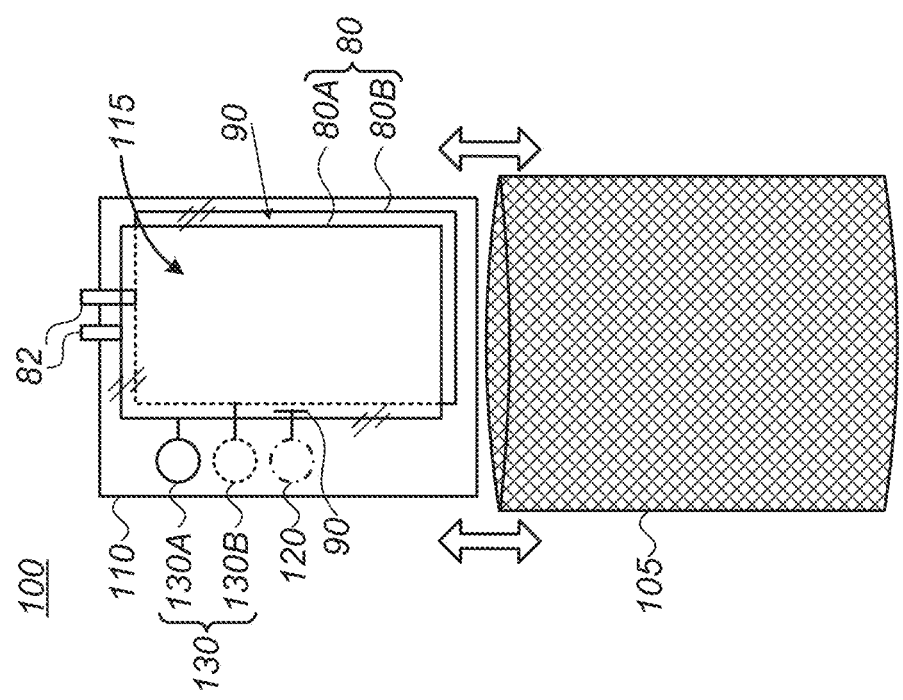
Figure 3:
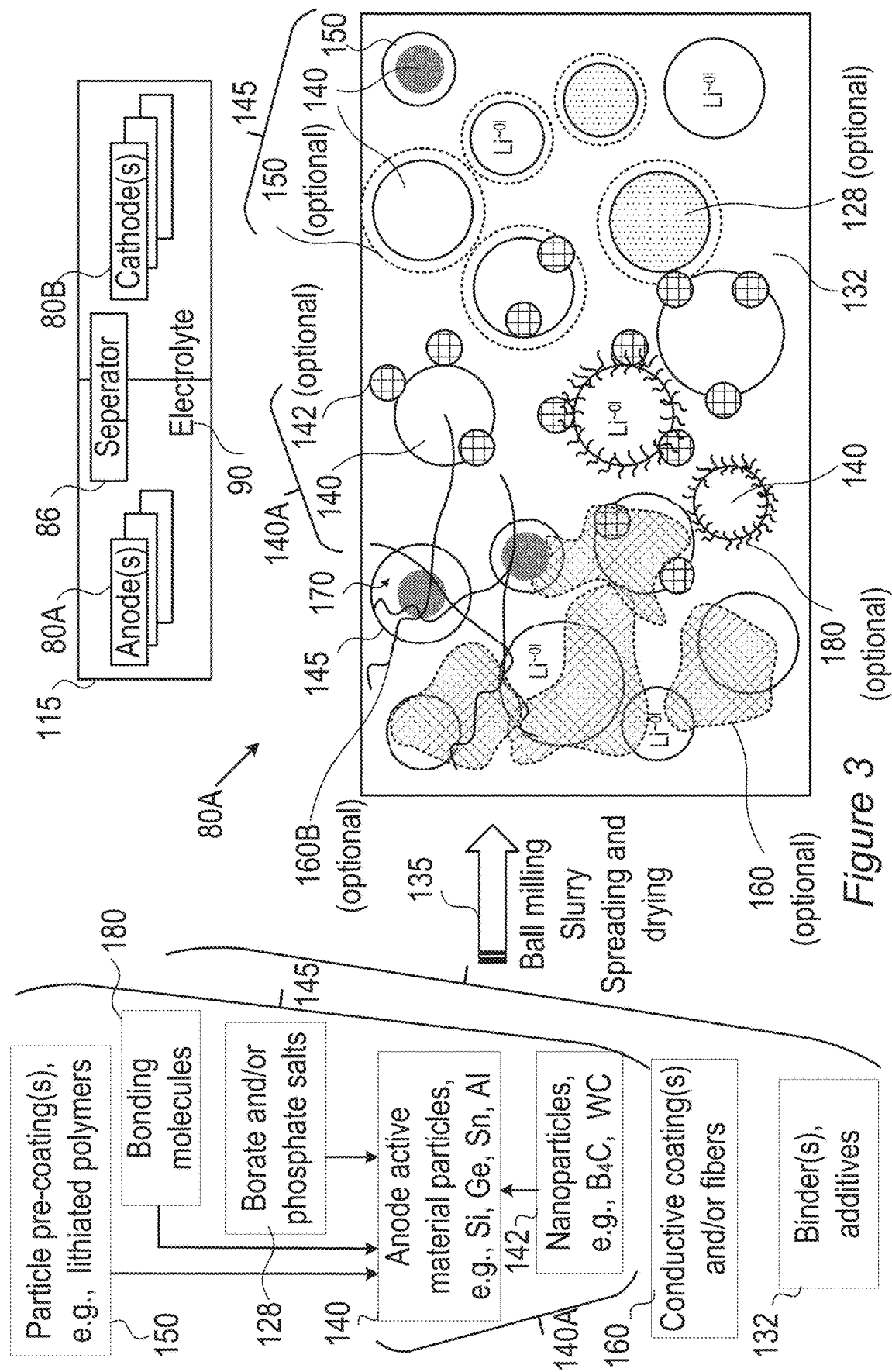
FIG. 3 is a high level schematic illustration of various anode configurations, according to some embodiments of the invention.

FIGS. 1A-1C are high level schematic illustration of lithium ion batteries 100, according to some embodiments of the invention. Lithium ion battery 100 comprises a transparent pouch 110 which encloses at least one lithium ion cell 115 in an operative condition. Transparent pouch 110 is configured to enable operation of lithium ion battery 100 without substantial damage and monitoring of the condition of cell(s) 115 and their components (e.g., electrodes 80, e.g. anode(s) 80A and cathode(s) 80B, electrolyte 90 and possibly additional components such as separator and current collector layers (not illustrated), and contacts 82)—while maintaining lithium ion battery 100 operative. Lithium ion battery 100 with transparent pouch 110 may be used in cell development processes to provide a simple and non-destructive way of monitoring cells 115 and/or during industrial production and during consumer use of batteries 100 for monitoring the operability and/or safety of batteries 100. For example, transparent pouch 110 may be used with cells 115 comprising anode(s) 80A comprising Si, Ge and/or Sn active material, as exemplified below (FIG. 3). Transparent pouch 110 may also be used with cells 115 comprising anode(s) 80A comprising graphite or other carbon-based materials.

In certain embodiments, lithium ion battery 100 further comprises an at least partly removable opaque cover 105, possibly at least partly attached to transparent pouch 110. FIG. 1A illustrates schematically removable cover 105, FIG.

1B illustrates schematically cover 105 which is partly attached to transparent pouch 110 (or to other external elements of battery 100), e.g., at one of its sides, and FIG. 1C illustrates schematically cover 105 which has changeable transparency, e.g., made at least partly of electrochromic material, has an at least partly opaque removable part etc. Removable cover 105 is shown in FIG. 1B in two non-limiting configurations and/or states, cover 105A exposing only a part of transparent pouch 110 which includes indicators 120, 130 (and possibly electrolyte 90—not shown in the figure) and cover 105B further exposing parts of transparent pouch 110 having cell components such as electrodes 80 and electrolyte 90. Removable cover 105 may be configured to have several states allowing different extents of exposure. Removable cover 105 is shown in FIG. 1C in two non-limiting configurations and/or states of transparency, cover state 105C being more opaque than cover state 105D. It is emphasized that at least one part of cover 105 may have at least two degrees of transparency. Multiple parts of changeable transparency and/or multiple degrees of transparency provide various embodiments of the invention.

Battery 100 may comprise indicators 120, 130 within transparent pouch 110 such as indicator(s) 130 connected to electrodes 80 (e.g., indicator 130A connected to electrode 80A and indicator 130B connected to electrode 80B) and/or indicator(s) 120 associated with electrolyte 90. Indicators 120, 130 may be configured to indicate a condition of corresponding electrolyte 90 and electrodes 80, possibly to enable exposure of only a small part of transparent pouch 110 (see e.g., left parts of FIGS. 1B and 1C) and minimize illumination damage to cell components such as electrolyte 90.

Transparent pouch 110 may be made of at least one transparent polymer, at least one electrochromic material and/or at least one partly absorptive material.

Electrolyte 90 may comprise one or more electrolyte or electrolyte components, any of which may be selected to be at least partly stable under illumination passing through transparent pouch 110.

Figure 2:
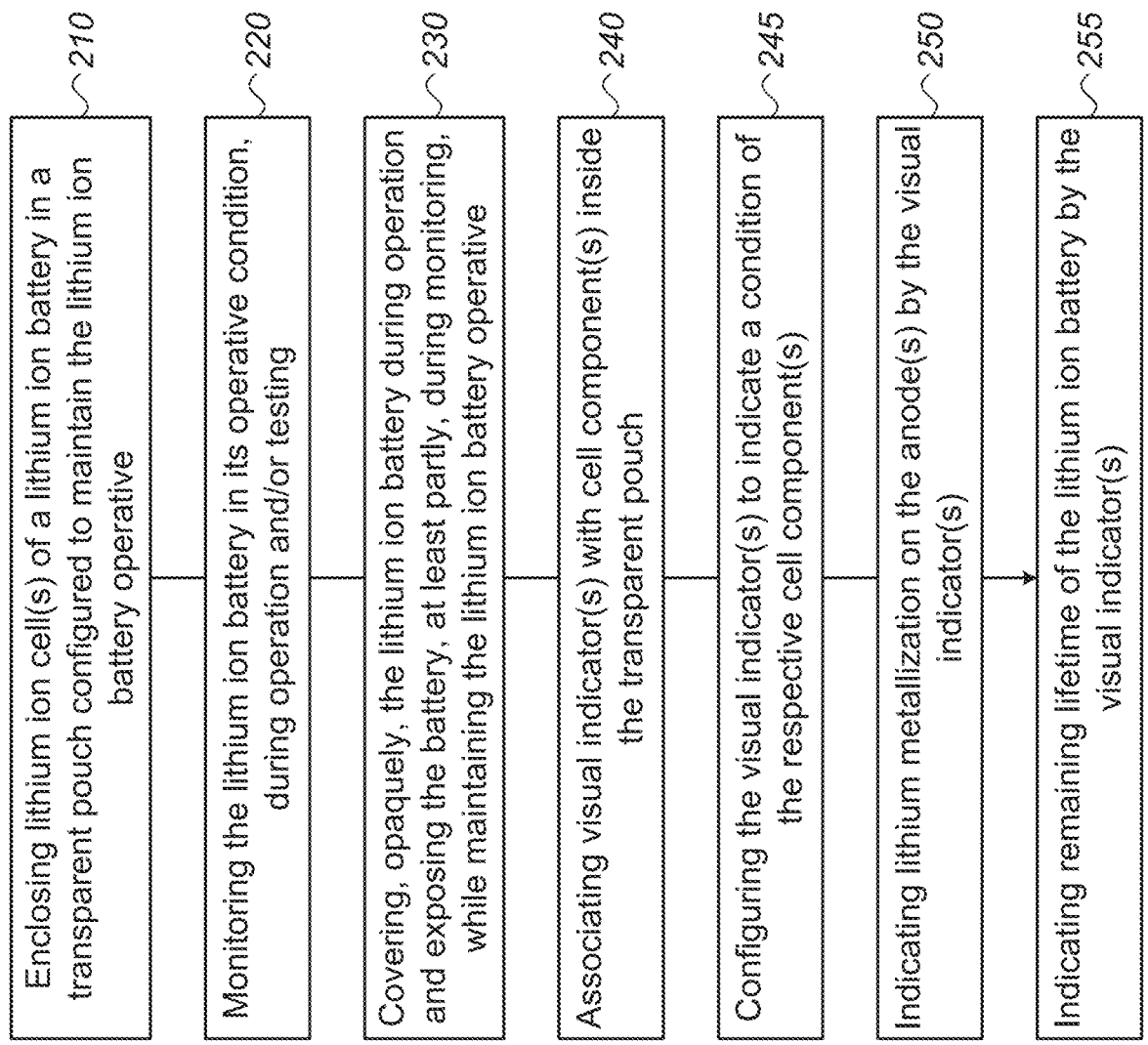
FIG. 2 is a high level flowchart illustrating a method, according to some embodiments of the invention.

FIG. 2 is a high level flowchart illustrating a method 200, according to some embodiments of the invention. The method stages may be carried out with respect to battery 100 described above, which may optionally be configured to implement method 200. Method 200 may comprise stages for producing, preparing and/or using battery 100, such as any of the following stages, irrespective of their order.

Method 200 comprises enclosing at least one lithium ion cell of a lithium ion battery in a transparent pouch configured to maintain an operative condition of the lithium ion battery (stage 210), and monitoring the lithium ion battery in the operative condition thereof (stage 220) e.g., during operation and/or testing.

Method 200 may further comprise covering, opaquely, the lithium ion battery during operation and exposing at least part of the lithium ion battery during monitoring, while maintaining the lithium ion battery in the operative condition (stage 230).

Method 200 may further comprise associating at least one visual indicator with at least one cell component inside the transparent pouch (stage 240), and the at least one visual indicator may be configured to indicate a condition of the respective at least one cell component (stage 245).

Method 200 may comprise indicating lithium metallization on an anode of the at least one lithium ion cell by the at least one visual indicator (stage 250) and/or indicating remaining lifetime of the lithium ion battery by the at least one visual indicator (stage 255).

FIG. 3 is a high level schematic illustration of various anode configurations, according to some embodiments of the invention. Embodiments of cells 115 enable fast charging rates with enhanced safety due to much reduced probability of metallization of lithium on the anode, preventing dendrite growth and related risks of fire or explosion. Anode material particles may have buffering zones for partly reducing and gradually introducing lithium ions into the anode for lithiation, to prevent lithium ion accumulation at the anode electrolyte interface and consequent metallization and dendrite growth. The electrolyte in the cell may be chosen to further reduce the accumulation rate of lithium ions at the interface, while maintaining the lithiation in the anode material is the rate limiting factor.

FIG. 3 illustrates schematically, in a non-limiting manner, a surface of anode 80A, which may comprise anode active material particles 140 (e.g., particles of metalloids such as silicon, germanium and/or tin, and/or of aluminum), and/or possibly composite core-shell particles 145, at different sizes (e.g., in the order of magnitude of 100 nm, e.g., 100-500 nm, and/or possible in the order of magnitude of 10 nm or 1μ)—for receiving lithiated lithium during charging and releasing lithium ions during discharging. Anodes 80A may further comprise binder(s) and additive(s) 132 as well as optionally coatings 160 (e.g., conductive polymers 160A with or without lithium, conductive fibers 160B (not shown in the figure) such as CNTs (carbon nanotubes) or carbon fibers). Active material particles 140 may be pre-coated by one or more coatings 150 (e.g., by conductive polymers, lithium polymers, etc.), have borate and/or phosphate salt(s) 128 bond to their surface (possibly forming e.g., $B_2O_3$, $P_2O_5$), bonding molecules 180 (illustrated schematically) which may interact with electrolyte 90 (and/or ionic liquid additives thereto) and/or various nanoparticles 142 (e.g., $B_4C$, WC, VC, TiN) (forming modified anode active material particles 140A), may be attached thereto in anode preparation processes 135 such as ball milling (see, e.g., U.S. Pat. No. 9,406,927, which is incorporated herein by reference in its entirety), slurry formation, spreading of the slurry and drying the spread slurry. For example, anode preparation processes 135 may comprise mixing additive(s) 132, such as e.g., binder(s) (e.g., polyvinylidene fluoride, PVDF, styrene butadiene rubber, SBR, or any other binder), plasticizer(s) and/or conductive filler(s) with a solvent, such as water or organic solvent(s) (in which the anode materials have limited solubility), to make an anode slurry which is then dried, consolidated and is positioned in contact with a current collector (e.g., a metal, such as aluminum or copper). Details for some of these possible configurations are disclosed below.

It is explicitly noted that in certain embodiments, cathodes may be prepared according to disclosed embodiments, and the use of the term anode is not limiting the scope of the invention. Any mention of the term anode may be replaced in some embodiments with the terms electrode and/or cathode, and corresponding cell elements may be provided in certain embodiments. For example, in cells 115 configured to provide both fast charging and fast discharging, one or both electrodes 80A, 80B may be prepared according to embodiments of the disclosed invention.

Anode material particles 140, 140A, 145, anodes 80A and cells 115 may be configured according to the disclosed principles to enable high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

In certain embodiments, anode 80A may comprise conductive fibers 160B which may extend throughout anode 80A (illustrated, in a non-limiting manner, only at a section of anode 80A) interconnect cores 140 and interconnected among themselves. Electronic conductivity may be enhanced by any of the following: binder and additives 132, coatings 160A, conductive fibers 160B, nanoparticles 142 and pre-coatings 150, which may be in contact with electronic conductive material (e.g., fibers) 160.

Lithium ion cell 115 comprises anode(s) 80A (in any of its configurations disclosed herein) made of anode material with composite anode material such as any of anode material particles 140, 140A, 145, electrolyte 90 and at least cathode 80B delivering lithium ions during charging through cell separator 86 to anode 80A. Lithium ions ($Li^+$) are lithiated (to $Li^{-01}$, indicating substantially non-charged lithium, in its lithiation state) when penetrating the anode material, e.g., into anode active material cores 140 (possibly of core-shell particles 145). Any of the configurations of composite anode material and core-shell particles 145 presented below may be used in anode 80A, as particles 145 are illustrated in a generic, non-limiting way. In core-shell particle configurations 145, the shell may be at least partly be provided by coating(s) 150, and may be configured to provide a gap 170 for anode active material 140 to expand upon lithiation. In some embodiments, gap 170 may be implemented by an elastic or plastic filling material and/or by the flexibility of coating(s) 150 which may extend as anode active material cores 140 expands and thereby effective provide room for expansion, in a non-limiting manner as gap 170. Examples for both types of gaps 170 are provided below, and may be combined, e.g., by providing small gap 170 and enabling further place for expansion by the coating flexibility.

Examples for electrolyte 90 may comprise liquid electrolytes such as ethylene carbonate, diethyl carbonate, propylene carbonate, fluoroethylene carbonate (FEC), and combinations thereof and/or solid electrolytes such as polymeric electrolytes such as polyethylene oxide, fluorine-containing polymers and copolymers (e.g., polytetrafluoroethylene), and combinations thereof. Electrolyte 90 may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP) and combinations thereof. Ionic liquid(s) may be added to electrolyte 90 as disclosed below. Cathode(s) 80B may comprise various compositions, such as $LiCoO_2$, $LiCo_{0.33}Mn_{0.33}Ni_{0.33}O_2$, $LiMn_2O_4$, $LiFePO_4$ and/or combinations thereof. Separator(s) 86 may comprise various materials, e.g., polyolefins such as polyethylene (PE) or polypropylene (PP), or other appropriate materials.

The different configurations are illustrated schematically in different regions of the anode surface, yet embodiments may comprise any combinations of these configurations as well as any extent of anode surface with any of the disclosed configurations. Anode(s) 80A may then be integrated in cells 115 which may be part of lithium ion batteries, together with corresponding cathode(s) 80B, electrolyte 90 and separator 86, as well as other battery components (e.g., current collectors, electrolyte additives, battery pouch 110, contacts 82, and so forth).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
    enclosing at least one lithium ion cell of a lithium ion battery and at least one visual indicator in a transparent pouch configured to maintain an operative condition of the lithium ion battery,
    covering at least a majority of an anode and a cathode of the lithium ion battery during its operation while maintaining the at least one visual indicator exposed, wherein the at least one visual indicator is positioned to a side of the anode and the cathode, is associated with at least one cell component and is configured to indicate a condition of the respective at least one cell component; wherein the at least one cell component is selected out of the anode, the cathode, and an electrolyte of the lithium ion battery; and
    monitoring lithium metallization on an anode of the lithium ion battery in the operative condition thereof.

2. The method of claim 1, comprising covering an entirety of the anode and the cathode of the lithium ion battery during the monitoring, while maintaining the lithium ion battery in the operative condition.

3. The method of claim 1, wherein the at least one visual indicator comprises visual indicators are configured to indicate a condition of at least two out of the anode, the cathode and the electrolyte.

4. The method of claim 3, further comprising indicating lithium metallization on an anode of the at least one lithium ion cell by the at least one visual indicator.

5. The method of claim 3, further comprising indicating remaining lifetime of the lithium ion battery by the at least one visual indicator.

6. The method of claim 1, wherein the monitoring of the lithium metallization is carried out directly, through at least a part of the transparent pouch.

7. A method comprising:
enclosing at least one lithium ion cell of a lithium ion battery in a transparent pouch configured to maintain an operative condition of the lithium ion battery,
covering the lithium ion battery at least partly during its operation, and
monitoring lithium metallization on an anode of the lithium ion battery in the operative condition thereof;
wherein the covering is carried out using a cover made of an electrochromic material used to indicate the lithium metallization on the anode; wherein when the cover is transparent the anode of the lithium ion battery is seen through the cover and the transparent pouch.

8. The method of claim 1, further comprising carrying out the monitoring during consumer use of batteries.

9. The method of claim 8, further comprising carrying out the monitoring during consumer use of batteries.

10. The method of claim 8, wherein the monitoring of the lithium metallization is carried out directly, through at least a part of the transparent pouch.

11. The method of claim 8, further comprising exposing at least part of the lithium ion battery during the monitoring, while maintaining the lithium ion battery in the operative condition.

12. The method of claim 8, further comprising associating at least one visual indicator with at least one cell component inside the transparent pouch, wherein the at least one visual indicator is exposed and is configured to indicate a condition of the respective at least one cell component while the lithium ion battery is covered.

13. The method of claim 12, further comprising indicating lithium metallization on an anode of the at least one lithium ion cell by the at least one visual indicator.

14. The method of claim 12, further comprising indicating remaining lifetime of the lithium ion battery by the at least one visual indicator.

15. The method according to claim 1 wherein the at least one visual indicator comprises a first visual indicator that is configured to indicate a condition of the anode, a second visual indicator that is configured to indicate a condition of the cathode, and a third a visual indicator that is configured to indicate a condition of the electrolyte.

16. The method according to claim 7 wherein the covering the lithium ion battery at least partly during its operation covering at least a majority of the anode and a cathode of the lithium ion battery during its operation while maintaining at least one visual indicator exposed, wherein the at least one visual indicator is positioned within the transparent pouch and to a side of the anode and the cathode, wherein the at least one visual indicator is associated with at least one cell component and is configured to indicate a condition of the respective at least one cell component; wherein the at least one cell component is selected out of the anode, the cathode and an electrolyte of the lithium ion battery.

17. The method according to claim 7 wherein the transparent pouch is made of at least one electrochromic material.

18. The method according to claim 1 wherein the transparent pouch is made of at least one electrochromic material.

* * * * *